United States Patent
Chang et al.

(10) Patent No.: US 6,984,903 B2
(45) Date of Patent: Jan. 10, 2006

(54) VIBRATOR AND RELATED APPARATUS FOR PROVIDING VIBRATION IN DIFFERENT DIRECTIONS

(75) Inventors: Yu-Chuan Chang, Taipei Hsien (TW); Jen-Cheng Lai, Tao-Yuan Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/904,043

(22) Filed: Oct. 21, 2004

(65) Prior Publication Data

US 2005/0088124 A1    Apr. 28, 2005

(30) Foreign Application Priority Data

Oct. 22, 2003    (TW) .............................. 92129346 A

(51) Int. Cl.
*H02K 33/00*    (2006.01)
*H02K 7/075*    (2006.01)

(52) U.S. Cl. ......................................... 310/36; 310/81

(58) Field of Classification Search ............ 310/80–81, 310/36–37; 335/228; 318/114; 340/407.1
See application file for complete search history.

(56) References Cited

U.S. PATENT DOCUMENTS 3,801,841 A * 4/1974 Hall ............................ 310/37
5,036,239 A * 7/1991 Yamaguchi .................. 310/268
6,479,914 B2 * 11/2002 Yoshida et al. .............. 310/81

FOREIGN PATENT DOCUMENTS

JP    6-303735    * 10/1994
JP    2001-340811    * 12/2001

* cited by examiner

*Primary Examiner*—Burton Mullins
(74) *Attorney, Agent, or Firm*—Winston Hsu

(57) ABSTRACT

A vibrator, applicable to a cell-phone or a pager for providing vibration in different directions to signal incoming messages. The vibrator includes a housing and an eccentric cam. The cam is capable of rotating around an axle to provide vibration along a horizontal plane perpendicular to the axle. In the first embodiment of the invention, an engaging structure (like a trail around the axis with different attitude with respect to the horizontal plane) is installed on the housing such that the cam is engaged to move up and down along the axle to provide vibration along an axial direction. In the second embodiment of the invention, at least a vibrating body, capable of sliding along the axial direction, is installed on the housing, such that when the cam rotates, the vibrating body is engaged to move up and down to provide vibration along the axis.

21 Claims, 26 Drawing Sheets

VIBRATOR AND RELATED APPARATUS FOR PROVIDING VIBRATION IN DIFFERENT DIRECTIONS

BACKGROUND OF INVENTION

1. Field of the Invention

The invention relates to a vibrator applied to a mobile phone or a pager, and more particularly, to a vibrator producing vibration in different directions.

2. Description of the Prior Art

Along with progress of the semiconductor technology, capacity and weight of many electric devices, such as the watch, the alarm clock, the pager, or the mobile phone, are substantially reduced. These electric devices are portable to arrange schedule or access messages. For achieving the above-mentioned purposes, these electric devices generally send out a reminding signal. For example, a watch or an alarm clock usually sends out a reminding signal at a preset time, and a pager or a mobile phone usually sends out a reminding signal while receiving a telephone call. In general, the reminding signal is a specific sound or a vibration. Since the reminding sound may disturb other people, the effective vibrator is developed.

Please refer to FIG. 1 to FIG. 4. FIG. 1 is an exploded diagram of a vibrator 10 according to the prior art, FIG. 2 is a schematic diagram of a combined vibrator 10 according to the prior art, FIG. 3 is a cross-sectional view of a vibrator 10 along line 3—3 in FIG. 2, and FIG. 4 is a top view of a vibrator 10 without a housing. A cam 16 is installed in the housings 12A, 12B, and the cam 16 rotates on a plane 27 around an axle 26 that is perpendicular to the plane 27 (rotates along direction 25 in FIG. 2). In the housings 12A, 12B, besides the cam 16, two conductive brushes 14A, 14B, and two magnets 18A, 18B are further installed. Two coils 20A, 20B are equipped on the cam 16 to conduct to the conductive sheets 22 and a weight adjuster 15. The magnets 18A, 18B are fixed on the bottom of the housing, and one end of the brushes 14A, 14B is fixed on the housing 12A and the other end is contacted to the conductive sheets 22, as FIG. 2 and FIG. 3 show. With the brushes 14A, 14B, the magnets 18A, 18B, the conductive sheets 22, and the coils 20A, 20B, the cam 16 can joint the housings 12A, 12B to achieve function of a motor (such as a DC motor). As shown in FIG. 2 and FIG. 3, when the brushes 14A, 14B are electrically connected to a driving circuit 24 (such as a battery), the driving circuit 24 can provide power energy to the coils 20A, 20B through the brushes 14A, 14B and the conductive sheets 22. The coils 20A, 20B work as an electromagnet to alternately attract and repel the magnets 18A, 18B, and drive the cam 16 to rotate around the axle 26 along direction 25.

To fully utilize functions of the vibrator 10, the cam is designed in an asymmetric shape (shown in FIG. 1 to FIG. 4), the coils 20A, 20B are designed asymmetric to the axle 26, and the weight adjustor 15 is equipped on one side of the cam 16. These designs make the center of mass 19 of the cam 16 differ from the axle 26 with an eccentric center. The center of mass 19 of the cam 16 projected on the plane 27 substantially differs from a center position of the axle 26 to provide a horizontal vibration parallel to the plane 27. The transmission direction of the vibration is shown as direction 28 in FIG. 1 to FIG. 3.

Please refer to FIG. 5, which is a schematic diagram of another vibrator 30 according to the prior art. The coils 34A, 34B are installed in the housing 32, and the flexible shaft 36 is installed in another side of the housing. One end of the shaft 36 is fixed to the housing 32, and the other end has a magnetic pendulum 38 installed. When the coils 34A, 34B are electrically connected to a driving circuit 44 and receive a periodic power energy, the coils 34A, 34B work as an electromagnet to alternately attract and repel the pendulum 38. The pendulum 38 swings between the coils 34A, 34B and produces a vibration along direction 40.

The conventional vibrators 10, 30 have a limitation of the vibration direction. As shown in FIG. 1 to FIG. 4, the vibrator 10 can only produce a vibration parallel to the plane 27, and can do nothing to the perpendicular vibration. Similarly, as FIG. 5 shows, the vibrator 30 can only produce a vibration along directions 42A, 42B. These conventional vibrators are limited in the vibration direction, and may be easily counteracted. For example, if the vibrator 30 is compressed against the directions 42A, 42B, the vibration will be reduced and counteracted. Similarly, if the vibrator 10 is compressed against the direction 28, the vibration will be also reduced and counteracted.

SUMMARY OF INVENTION

It is therefore a primary objective of the claimed invention to provide a vibrator and related apparatus for providing vibration in different directions to solve the above-mentioned problem.

According to the claimed invention, the horizontal vibration is produced by an eccentric cam, and the vertical vibration is produced by an engaging structure. In an embodiment, the engaging structure has an engaging track fixed in the housing and contacting a surface of the cam, and the engaging track equipped around the axle is uneven to make the cam move up and down while rotating. In another embodiment, the engaging structure has electromagnets fixed in the housing, and the electromagnets produce a magnetic field periodically according to the electric power to make the cam move up and down along an axial direction in the housing. In addition, the claimed invention can has a sliding member and a sliding track equipped in the housing along the axial direction. Each sliding track corresponds to one sliding member to help the sliding member slide up and down in the housing while rotating. In all embodiments, the claimed vibrator provides vibration in horizontal and vertical directions, and can be applied to electric devices, such as the mobile phone or the pager.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
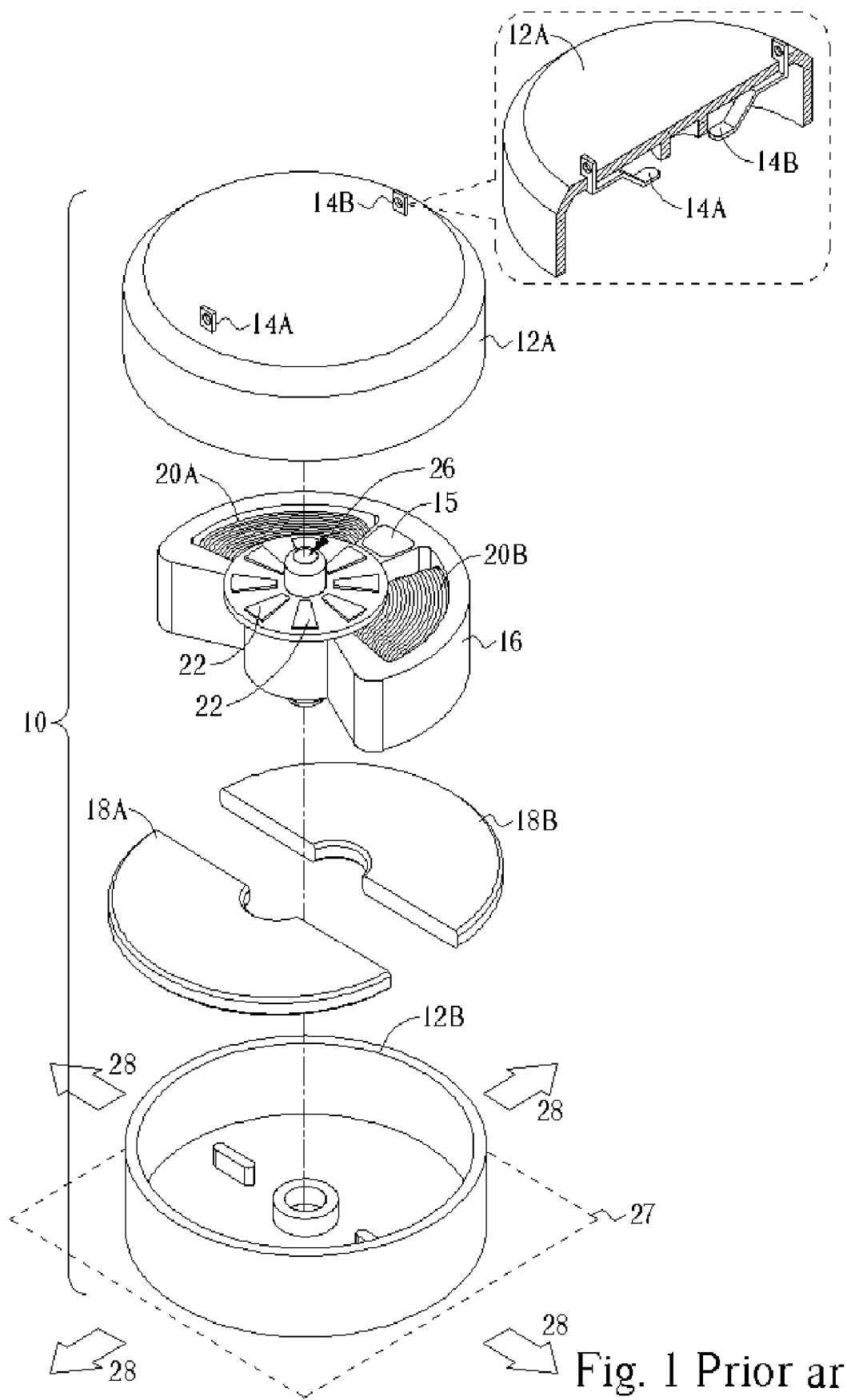
FIG. 1 is an exploded diagram of a vibrator according to the prior art.
Figure 2:
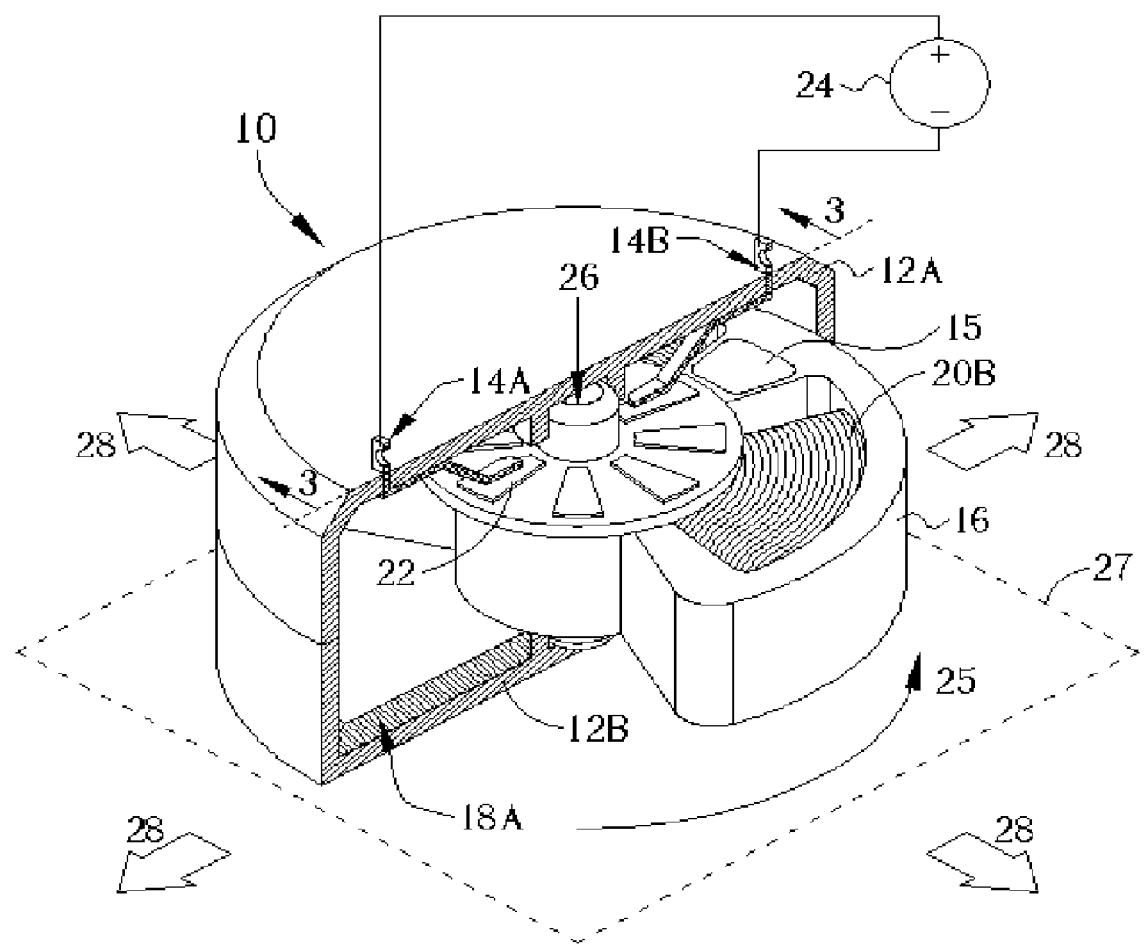
FIG. 2 is a schematic diagram of a combined vibrator according to the prior art.
Figure 3:
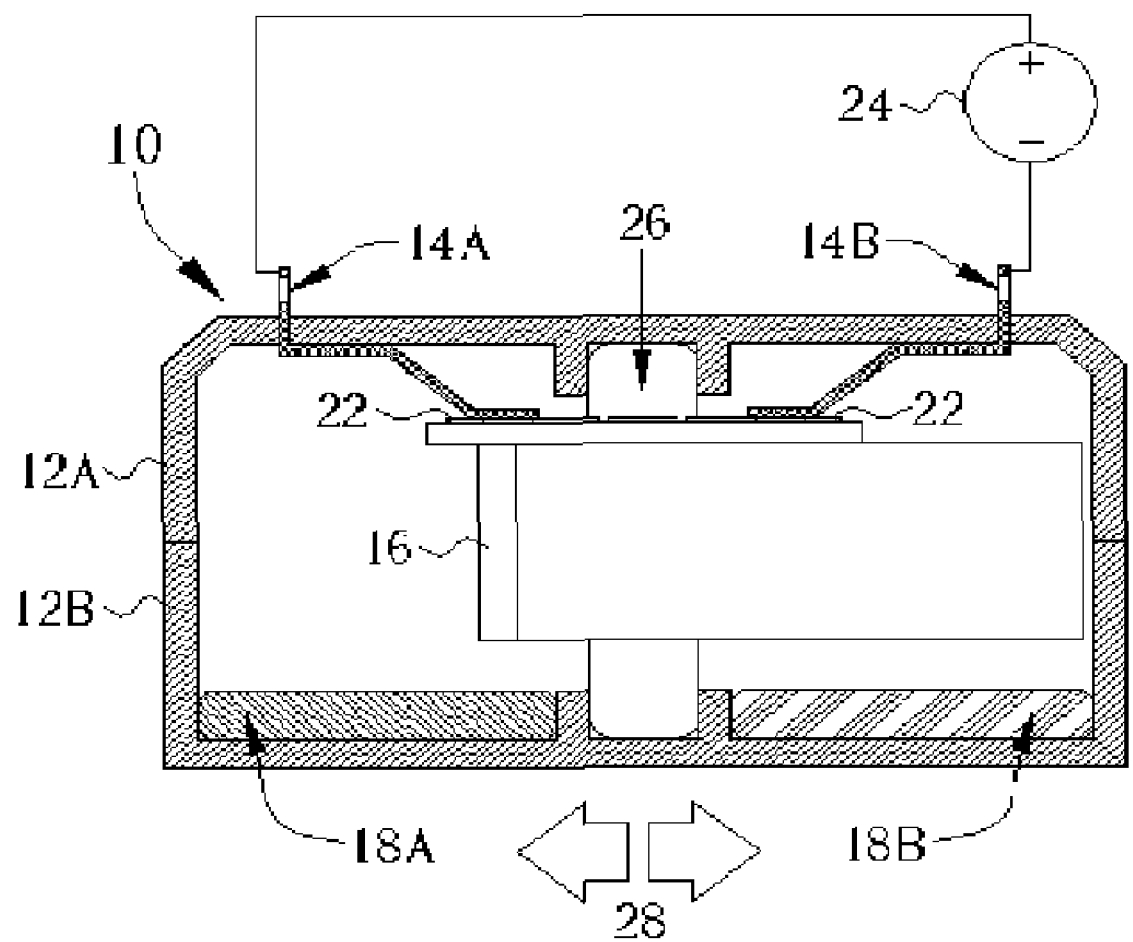
FIG. 3 is a cross-sectional view of a vibrator of FIG. 2.
Figure 4:
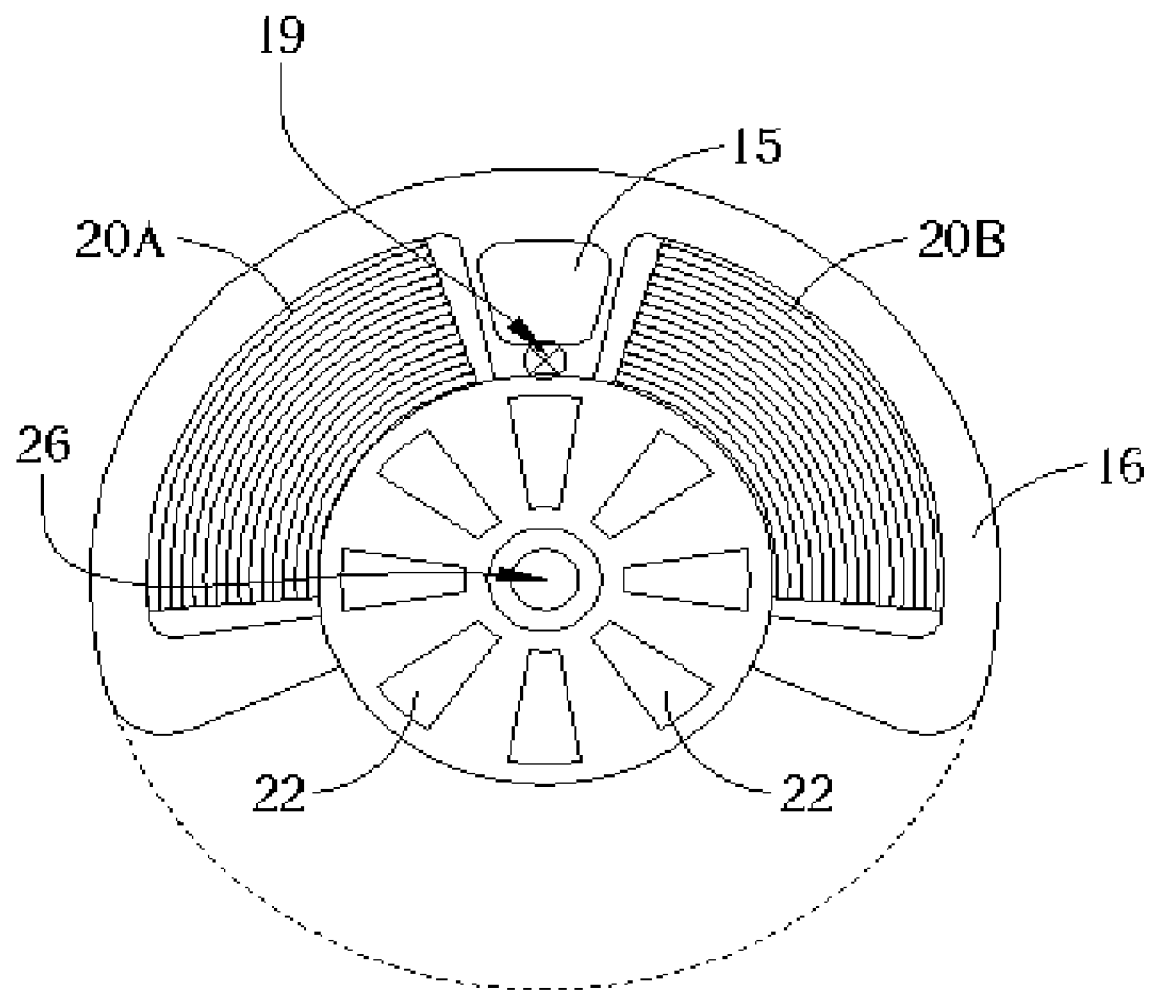
FIG. 4 is a top view of a vibrator of FIG. 2 without housing.
Figure 5:
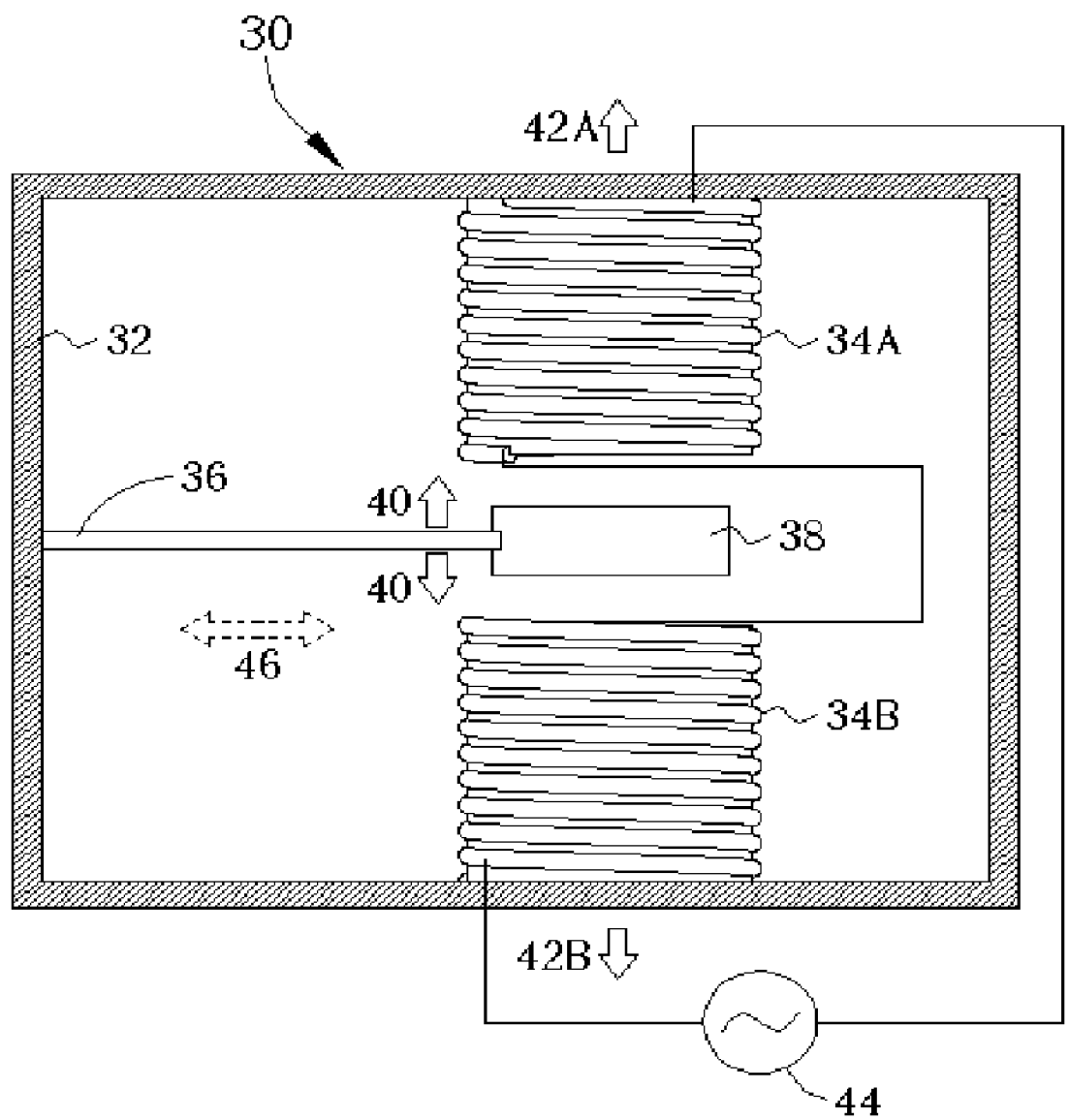
FIG. 5 is a schematic diagram of another vibrator according to the prior art.
Figure 6:
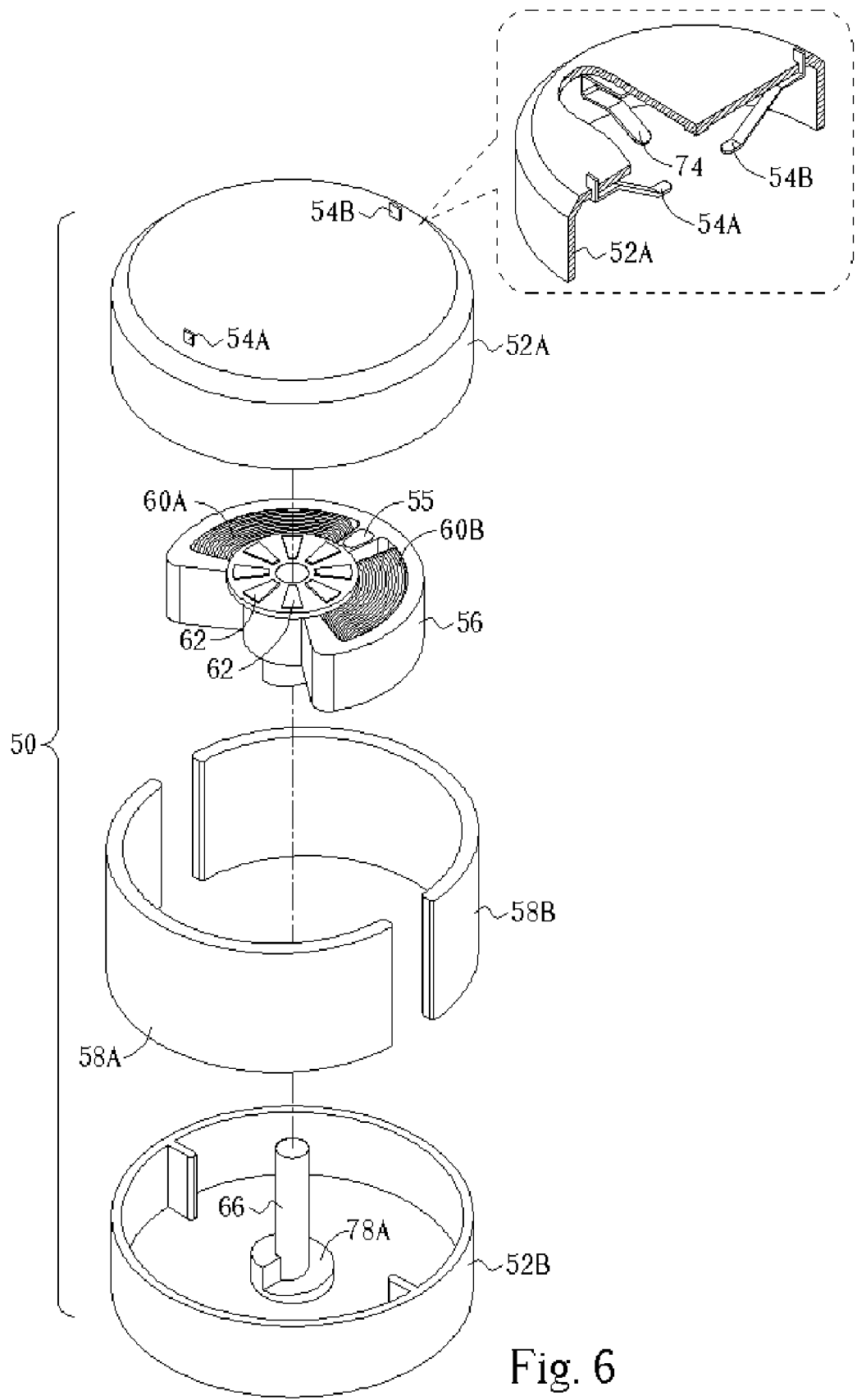
FIG. 6 is an exploded diagram of a vibrator according to the present invention.
Figure 7:
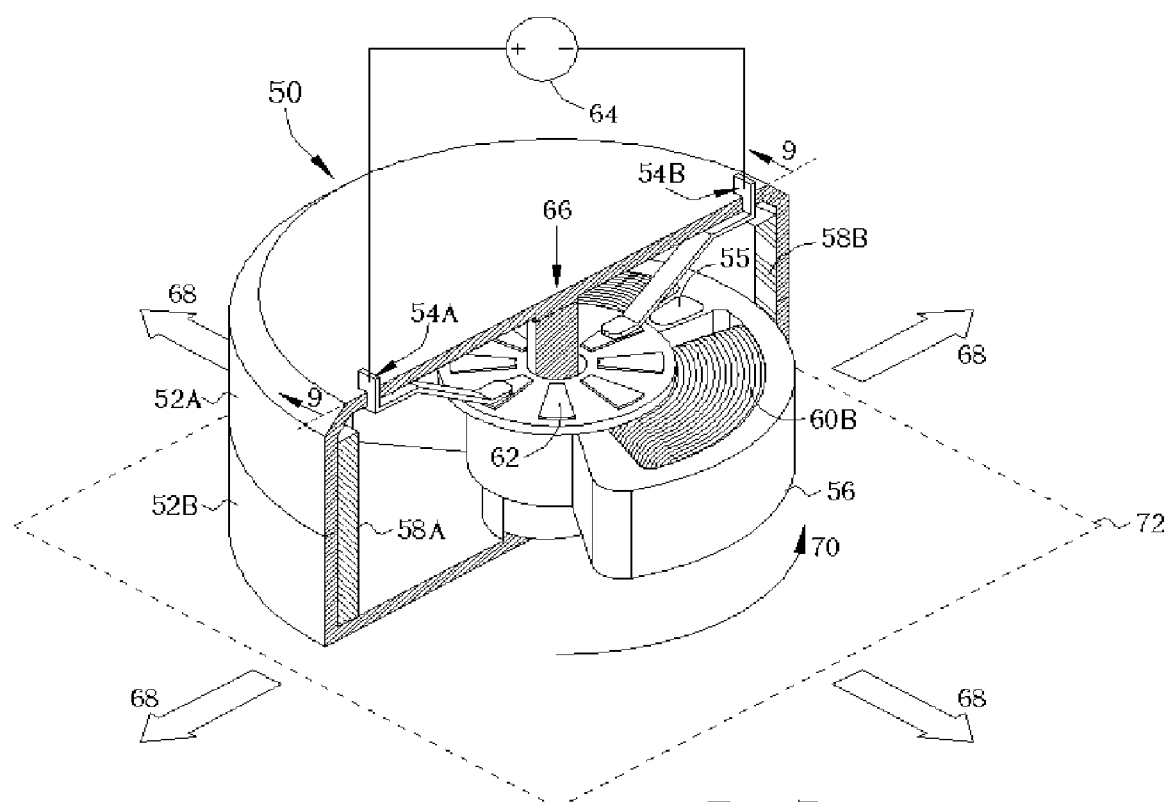
FIGS. 7, 8 are schematic diagrams of a combined vibrator according to the present invention.
Figure 8:
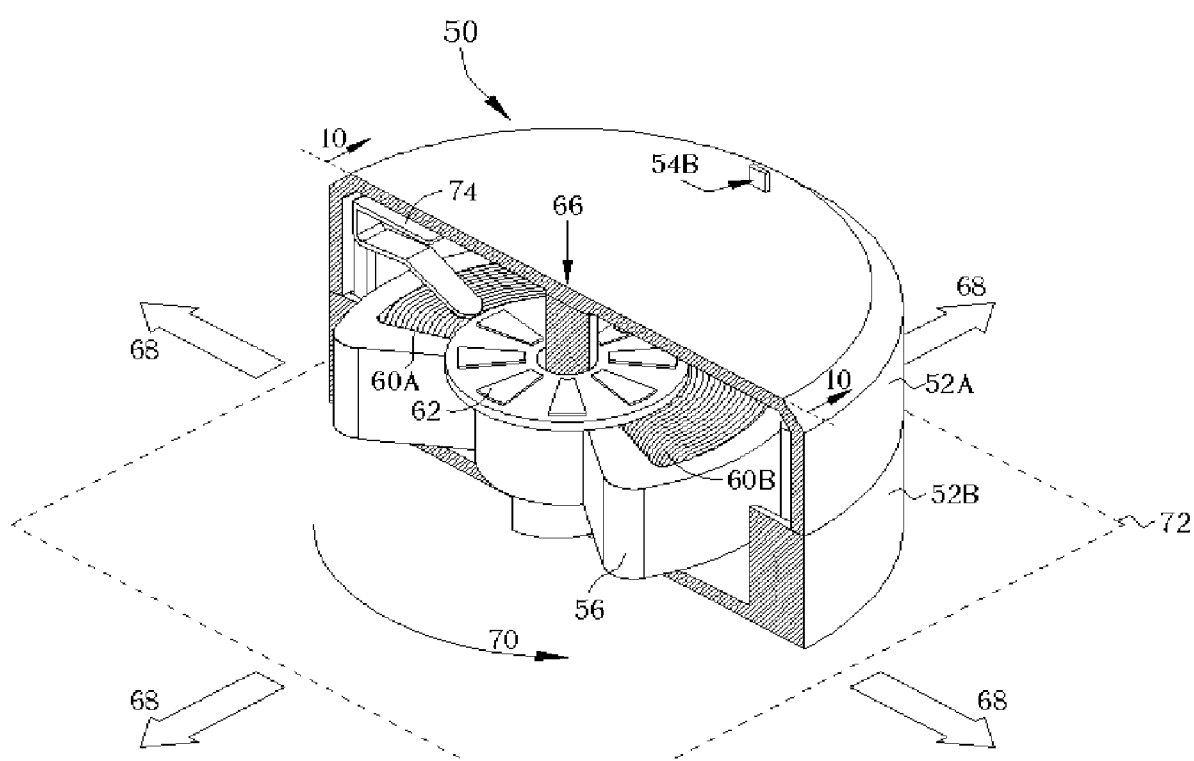
Figure 9:
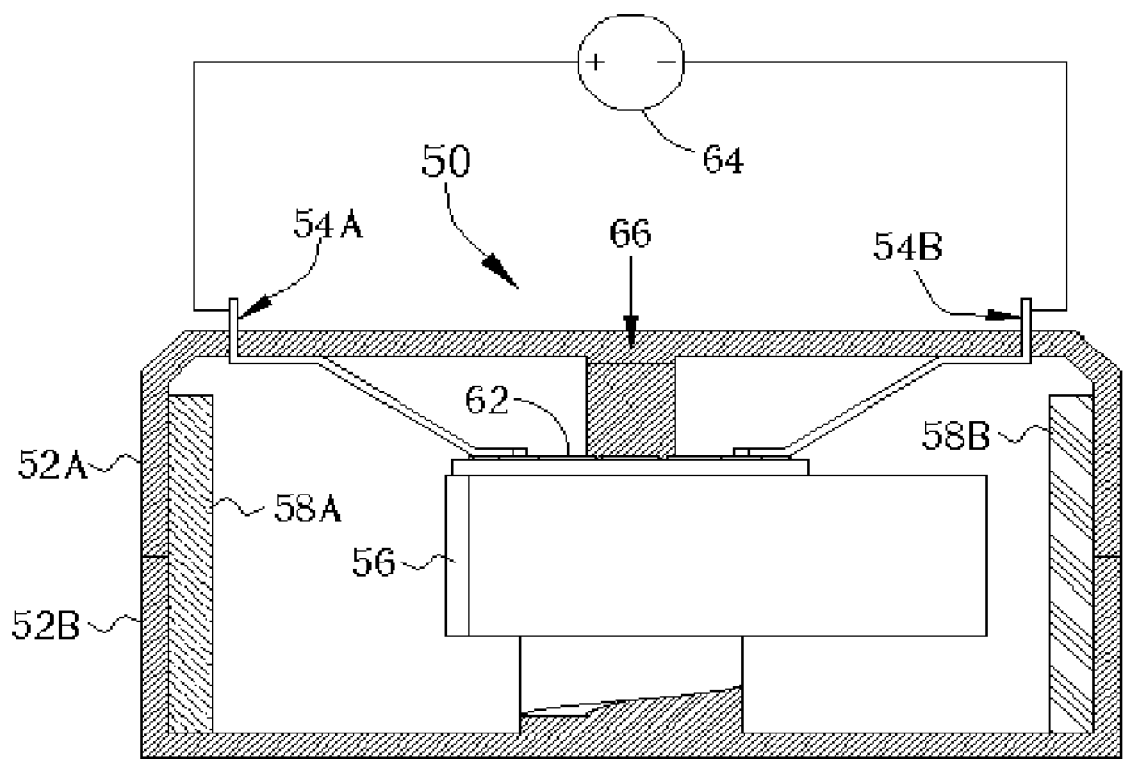
FIGS. 9, 10 are cross-sectional views of a vibrator of FIGS. 7, 8.
Figure 10:
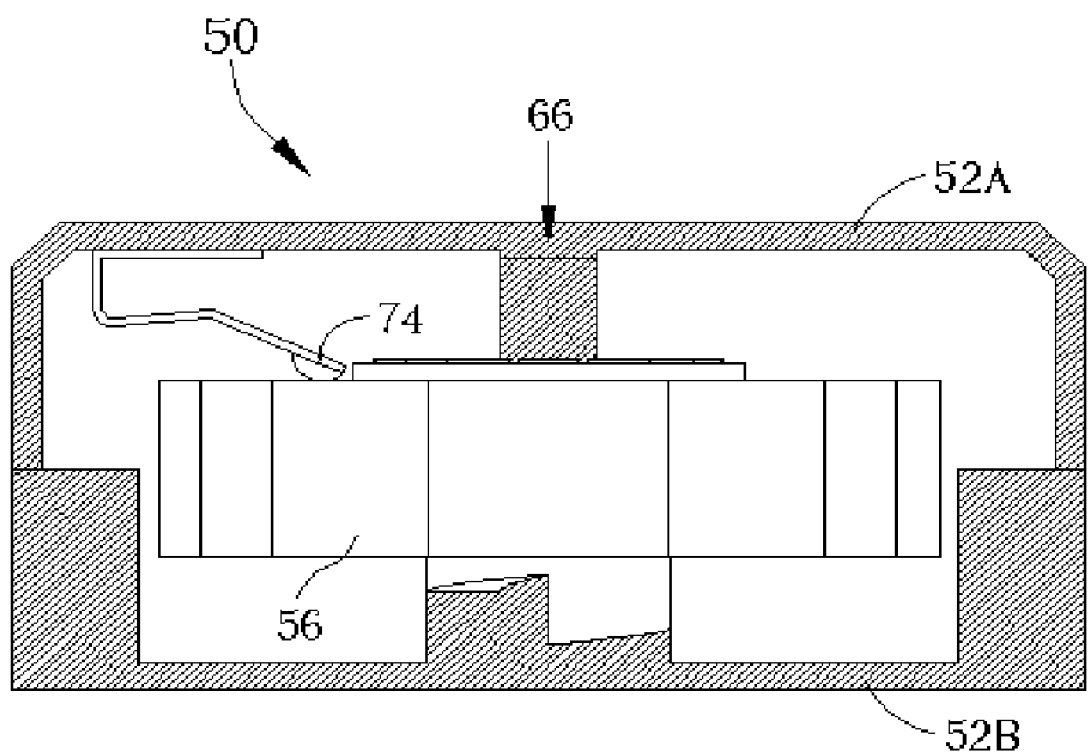
Figure 11:
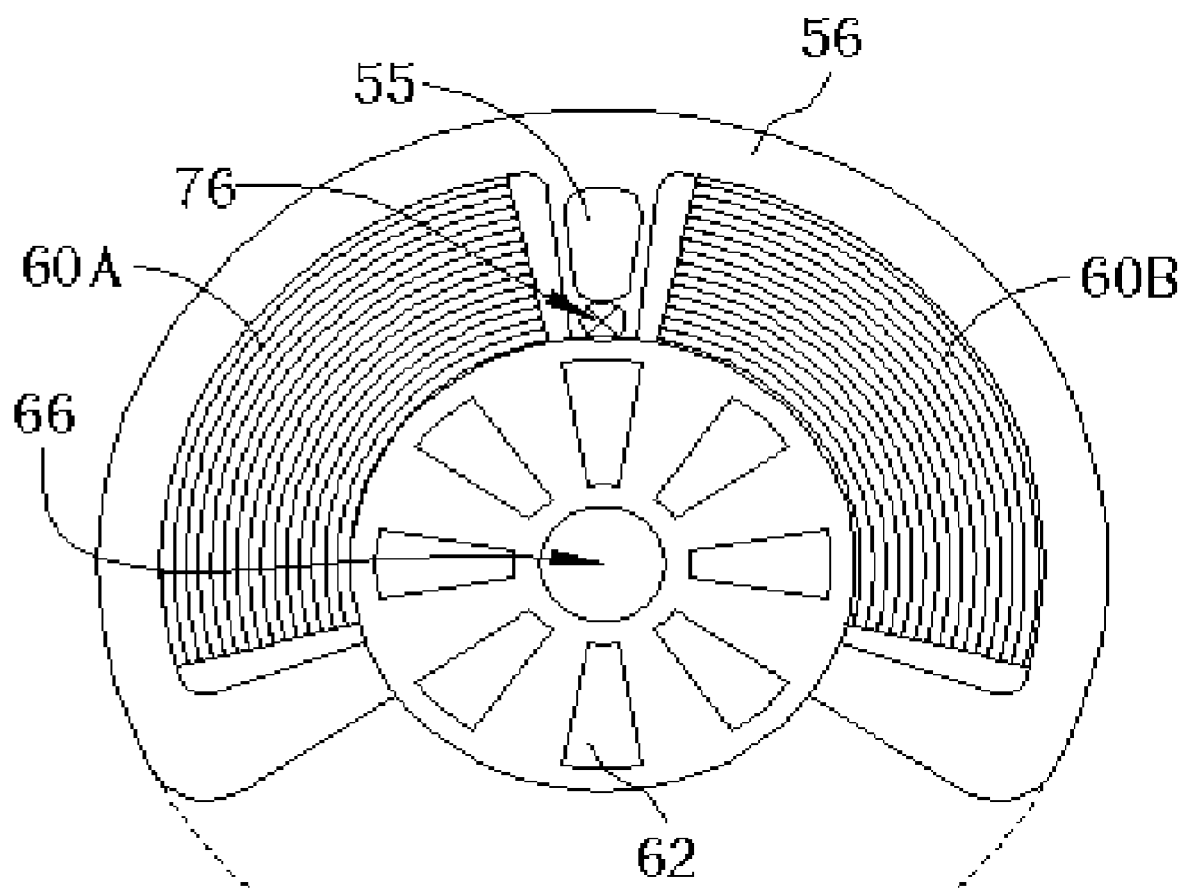
FIG. 11 is a top view of a vibrator of FIGS. 7, 8 without housing.

Please refer to FIG. 6 to FIG. 11. FIG. 6 is an exploded diagram of a vibrator 50 in an embodiment of the present invention, FIG. 7, FIG. 8 are schematic diagrams of the combined vibrator 50, FIG. 9, FIG. 10 are cross-sectional views of the vibrator 50 along line 9—9 and 10—10, and FIG. 11 is a top view of a vibrator 50 without housing. A cam 56 rotating around an axle 66, an elastomer 74, two magnets 58A, 58B and two conductive brushes 54A, 54B are installed in the housings 52A, 52B. Two coils 60A, 60B and the conductive sheets 62 are equipped on the cam 56. As FIG. 7 to FIG. 10 show, the magnets 58A, 58B are fixed on the bottom of the housing 52B, and one end of the brushes 54A, 54B is fixed on the housing 52A and the other end is contacted to the conductive sheets 62 (for detailed explanation, portions of the housings 52A, 52B are omitted in FIG. 7 to FIG. 10). When the brushes 54A, 54B are respectively connected to a driving circuit 64, the driving power is transmitted from the conductive sheets 62 to the coils 60A, 60B to drive the cam 56 to work as an electromagnet. The cam 56 equals a rotor in a motor, and alternately attracts and repels the magnets 58A, 58B to rotate around the axle 66 along direction 70.

As FIG. 11 shows, in the vibrator 50, the cam 56 is designed in an asymmetric shape, the coils 60A, 60B are designed asymmetric to the axle 66, and a weight adjustor 55 is equipped on one side of the cam 56. These designs make the center of mass 76 of the cam 56 differ from the axle 66 with an eccentric center. The center of mass 76 of the cam 56 projected on the plane 72 substantially differs from a center position of the axle 66 to provide a horizontal vibration parallel to the plane 72. The transmission direction of the vibration is shown as direction 68 in FIG. 7, FIG. 8.

Figure 12:
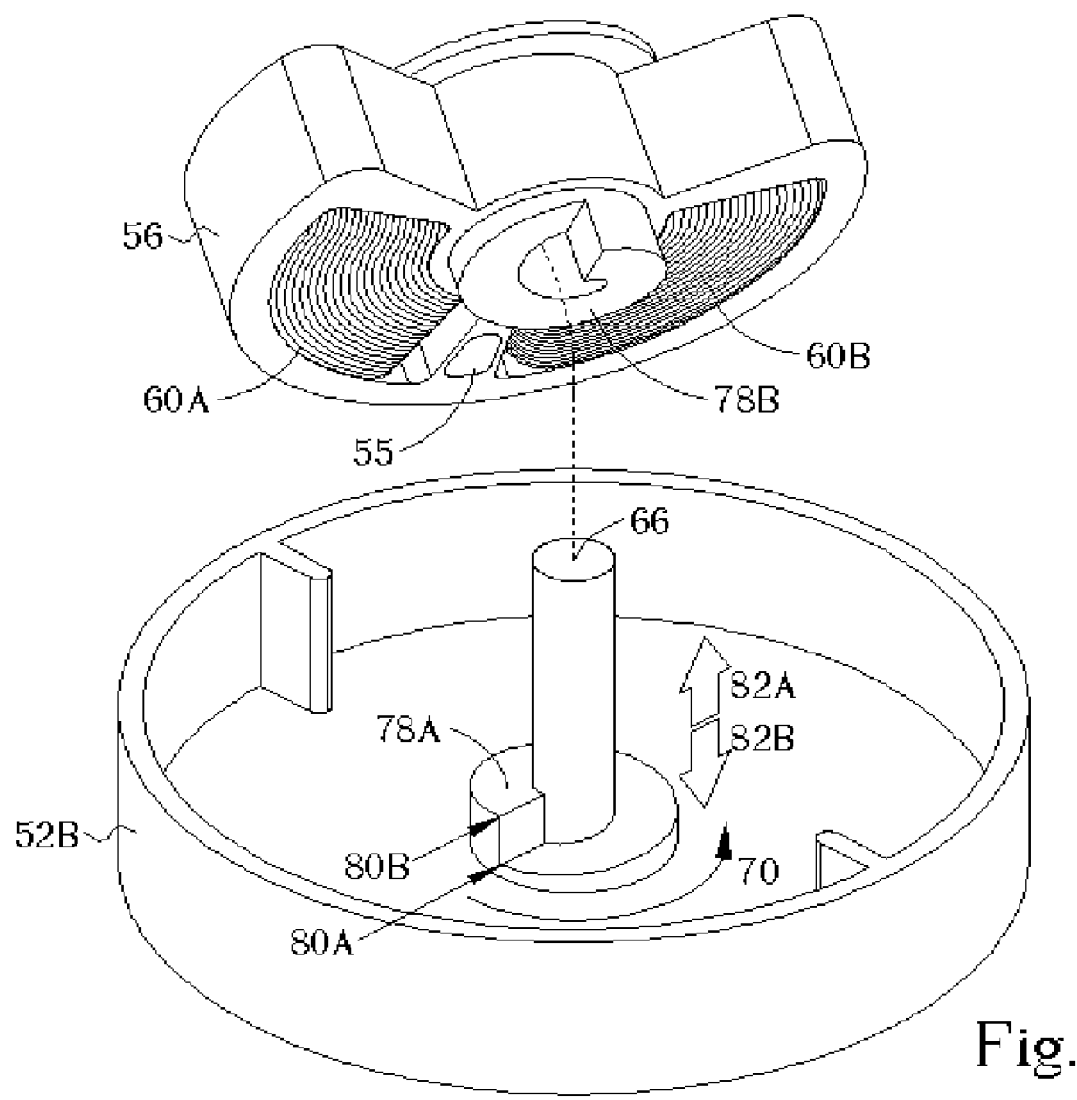
FIG. 12 is a schematic diagram of an engaging structure.

Besides the horizontal vibration, the claimed invention can further produce a vertical vibration. An engaging structure with an uneven engaging track is equipped on the bottom of the housing 52B and the cam 56. The engaging track can make the cam 56 move up and down while rotating and produce the vertical vibration. Please refer to FIG. 12, which is a schematic diagram of an engaging structure of a vibrator 50. A spiral engaging track 78A is designed on the housing 52B, and a corresponding engaging track 78B is also designed on the bottom of the cam 56. As shown in FIG. 12, the engaging track 78A spirals up from position 80A along direction 70, and suddenly drops from position 80B to the original height 80A after rotating a circle. Similarly, the engaging track 78B of the cam 56 also has a corresponding spiral. When the cam 56 is installed in the vibrator 50, the engaging tracks 78A, 78B will contact and engage each other, and lead the cam 56 move up and down while rotating along direction 70. Hence, the vertical vibration can be produced along direction 82A, 82B.

Figure 13:
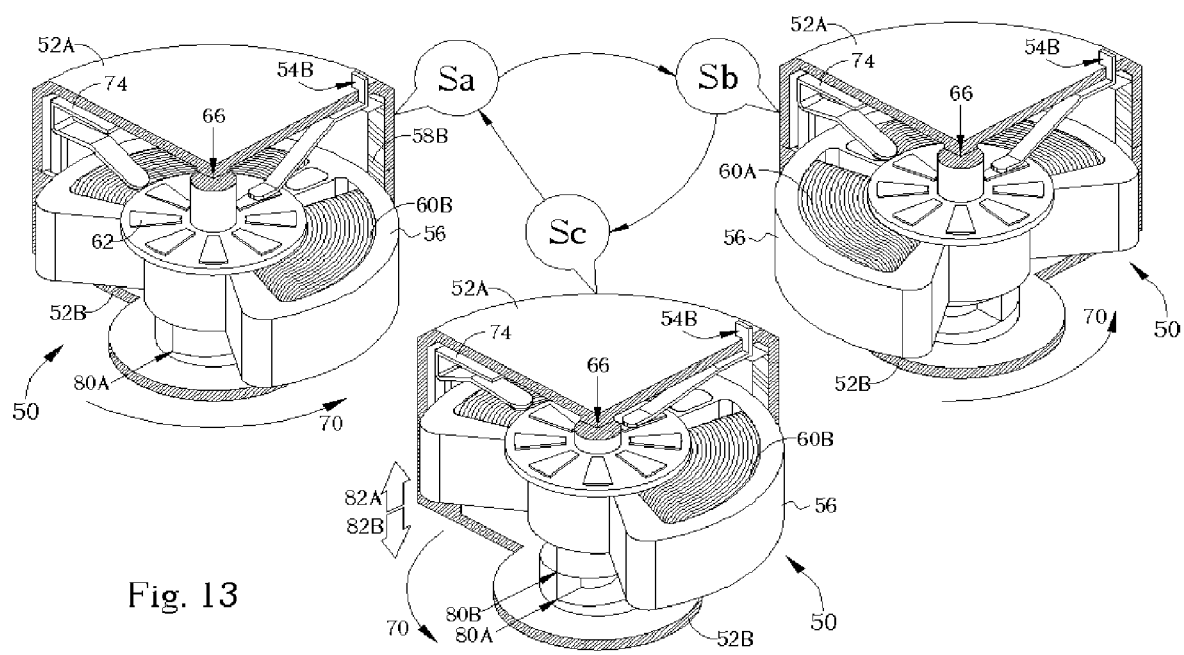
FIG. 13 is a schematic diagram of an engaging structure at different vertical positions.
Figure 14:
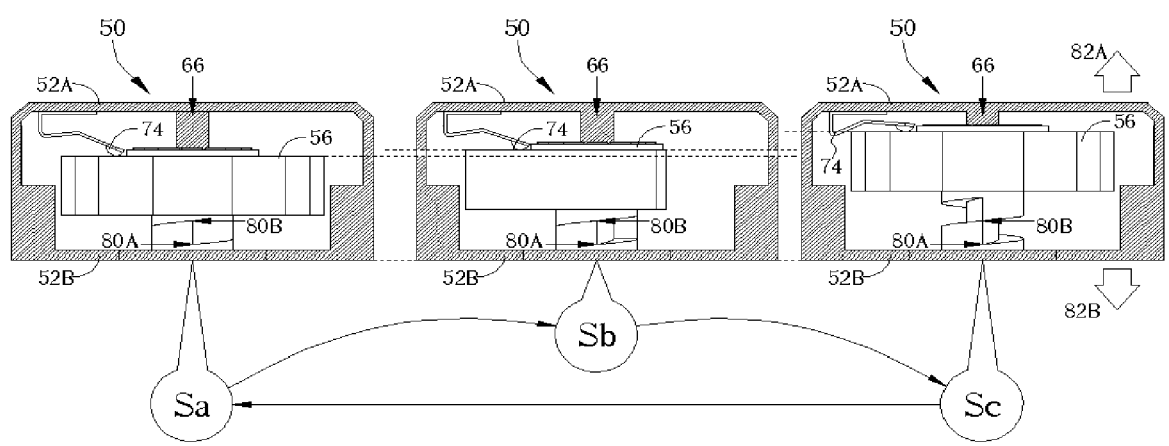
FIG. 14 is a cross-sectional view of an engaging structure of FIG. 13.

For insuring the tightness of the engaging tracks 78A, 78B while rotating, an elastomer 74 can be further equipped, as shown in FIG. 6 to FIG. 10. The elastomer 74 is a sheet metal with one end fixed on the housing 52A and the other end contacting the cam 56. The elastomer 74 pushes the cam 56 to insure the tightness of the engaging tracks 78A, 78B while rotating. Please refer to FIG. 13, FIG. 14, which are schematic diagrams of the engaging structure at different vertical positions (for detailed explanation, portions of the housings 52A, 52B are omitted). As FIG. 13, 14 show, when the vibrator 50 is in state Sa, the cam 56 starts to rotate around the axle 66 from position 80A along direction 70. When in state Sb, the cam 56 moves up with the engaging tracks 78A. In the embodiment of the claimed invention, the brushes 54A, 54B are flexible conductive metals and can keep contacting the conductive sheets 62 while moving up and down. Furthermore, if the brushes 54A, 54B have sufficient flexibility, the brushes 54A, 54B can substitute the elastomer 74.

After rotating a circle, the cam 56 is near to state Sc and at position 80B. As the rotation continues, the cam 56 suddenly falls to position 80A and produces a vertical vibration. The vertical vibration is produced along directions 82A, 82B. The position of the cam 56 is repeatedly circulated between Sa, Sb, and Sc. Combining the horizontal and vertical vibrations, the vibrator 50 can provide vibration in multiple directions.

Figure 15:
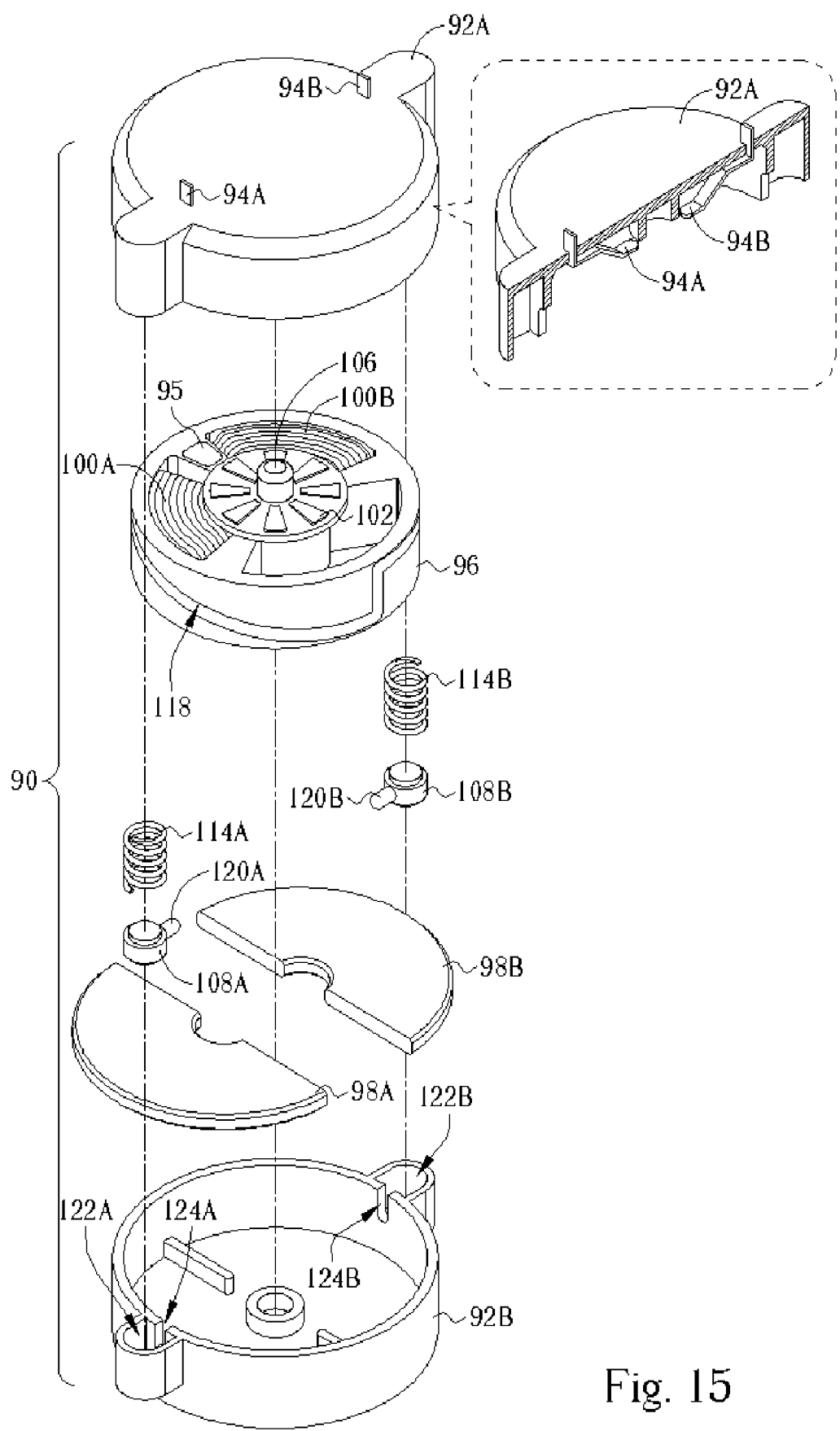
FIG. 15 is an exploded diagram of another vibrator according to the present invention.
Figure 16:
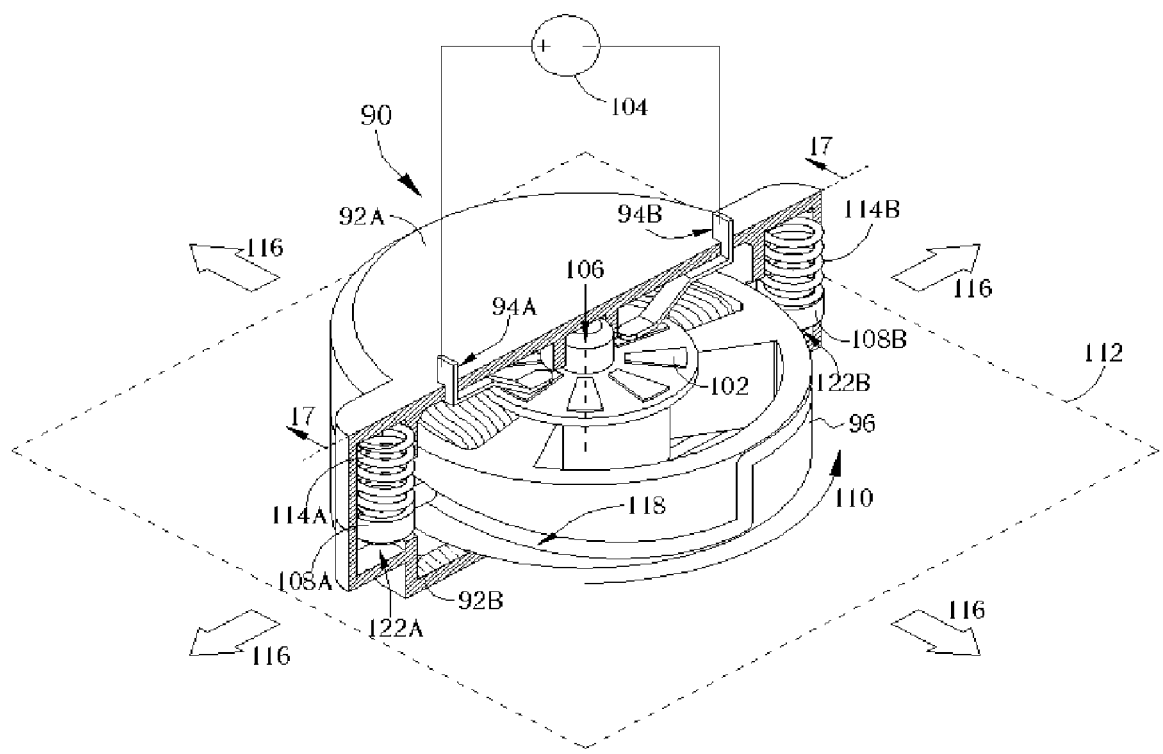
FIG. 16 is a schematic diagram of a combined vibrator of FIG. 15.
Figure 17:
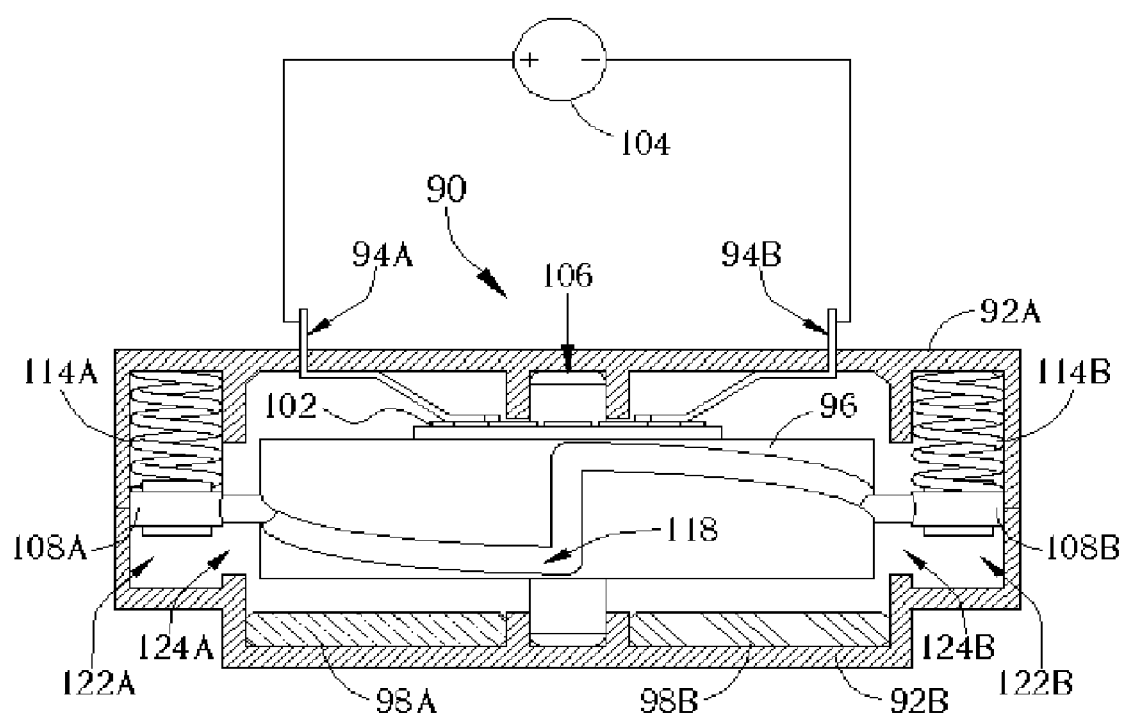
FIG. 17 is a cross-sectional view of a vibrator of FIG. 15.
Figure 18:
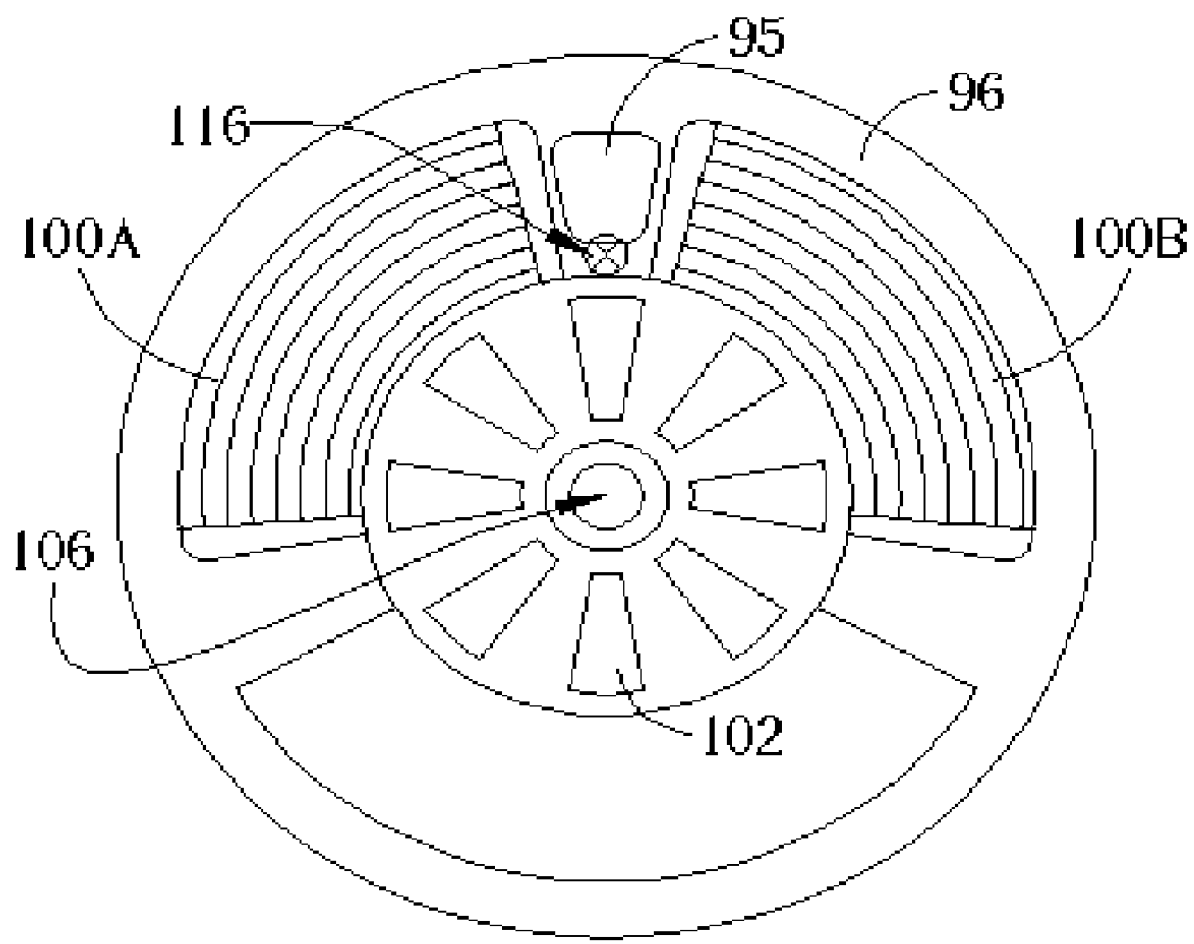
FIG. 18 is a top view of a vibrator of FIG. 15 without housing.

FIG. 15 to FIG. 18 show another embodiment of the claimed invention. FIG. 15 is an exploded diagram of another vibrator 90, FIG. 16 is a schematic diagram of an assembled vibrator 90, FIG. 17 is a cross-sectional view along line 17—17 in FIG. 16, and FIG. 18 is a top view of the vibrator 90 without housing. An eccentric cam 96 rotating around an axle 106, two conductive brushes 94A, 94B, and two magnets 98A, 98B are installed in the housings 92A, 92B. Two coils 100A, 100B and the conductive sheets 102 are equipped on the cam 96. One end of the brushes 94A, 94B is fixed on the housing 92A and the other end is contacted to the conductive sheets 102 (for detailed explanation, portions of the housings 92A, 92B are omitted in FIG. 15 to FIG. 18). When the brushes 94A, 94B are respectively connected to a driving circuit 104, the driving power is transmitted from the conductive sheets 102 to the coils 100A, 100B to drive the cam 96 to work as an electromagnet. The cam 96 alternately attracts and repels the magnets 98A, 98B and rotates along direction 110.

As FIG. 18 shows, in this embodiment, although the cam 96 has a circular shape, it can utilize the coils 100A, 100B and a weight adjustor 95 to achieve an asymmetric design. The center of mass 116 of the cam 96 projected on the plane 112 substantially differs from a center position of the axle 106 to provide a horizontal vibration parallel to the plane 112. The transmission direction of the vibration is shown as direction 116 in FIG. 16.

For providing the vertical vibration, the periphery of the cam 96 is designed a spiral engaging track 118, and the springs 114A, 114B and the sliding members 108A, 108B are designed in the housings 92A, 92B. The vertical fillisters 122A, 122B are designed in two sides of the housings 92A, 92B for allowing the sliding members 108A, 108B to slide. One side of each sliding member 108A, 108B contains a prominence 120A, 120B, and each fillister 122A, 122B contains a hole 124A, 124B facing the cam 96. The prominences 120A, 120B can engage the engaging track 118 through the holes 124A, 124B. As shown in FIG. 16, 17, when the vibrator 90 is combined, the sliding members 108A, 108B engage the engaging track 118 with the prominences 120A, 120B and form the engaging structure. When the cam 96 rotates around the axle 106, the spiral engaging track 118 will drive the sliding members 108A, 108B to slide in the fillisters 122A, 122B and produce a vertical vibration. For insuring the engaging relation of the sliding members 108A, 108B and the engaging track 118, the springs 114A, 114B are equipped in the vibrator 90. One end of each spring is fixed to the inside wall of the fillister, and the other end is connected to the corresponding sliding member. When the sliding members 108A, 108B slide up and down, the springs 114A, 114B can provide a restoring force.

Figure 19:
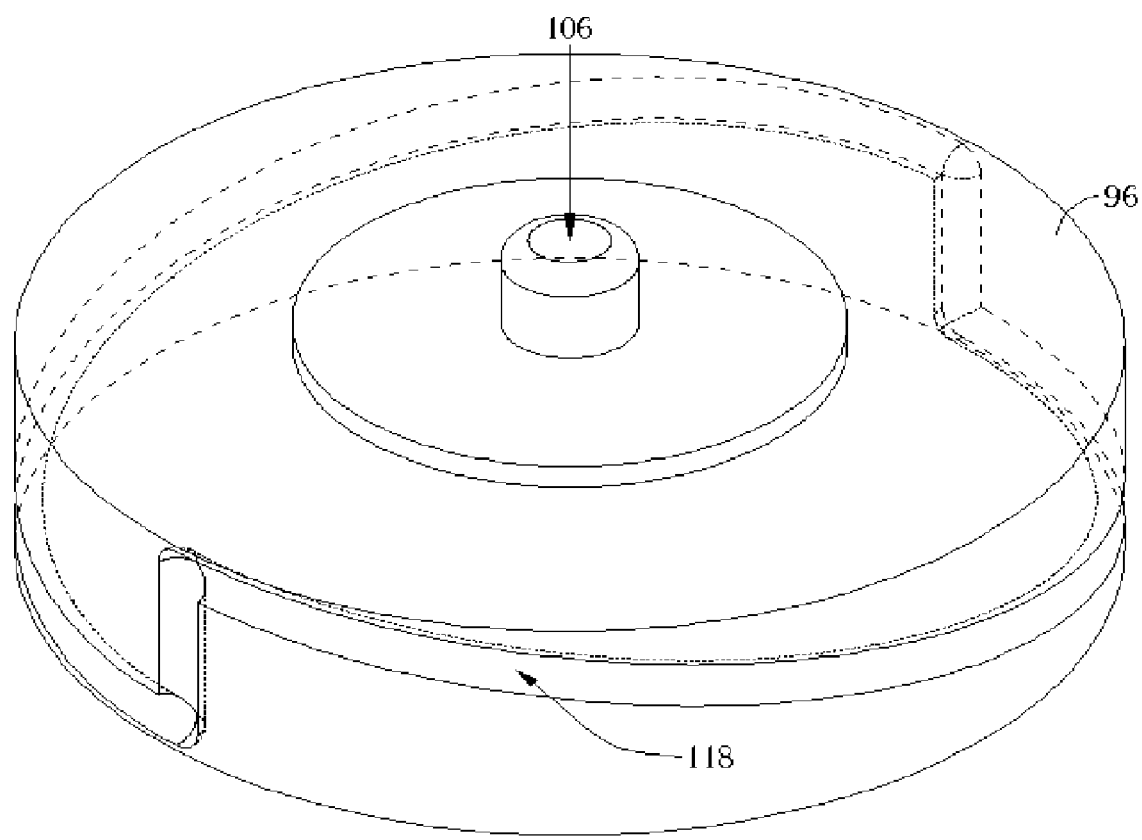
FIG. 19 is a schematic diagram of an engaging structure of FIG. 15.
Figure 20:
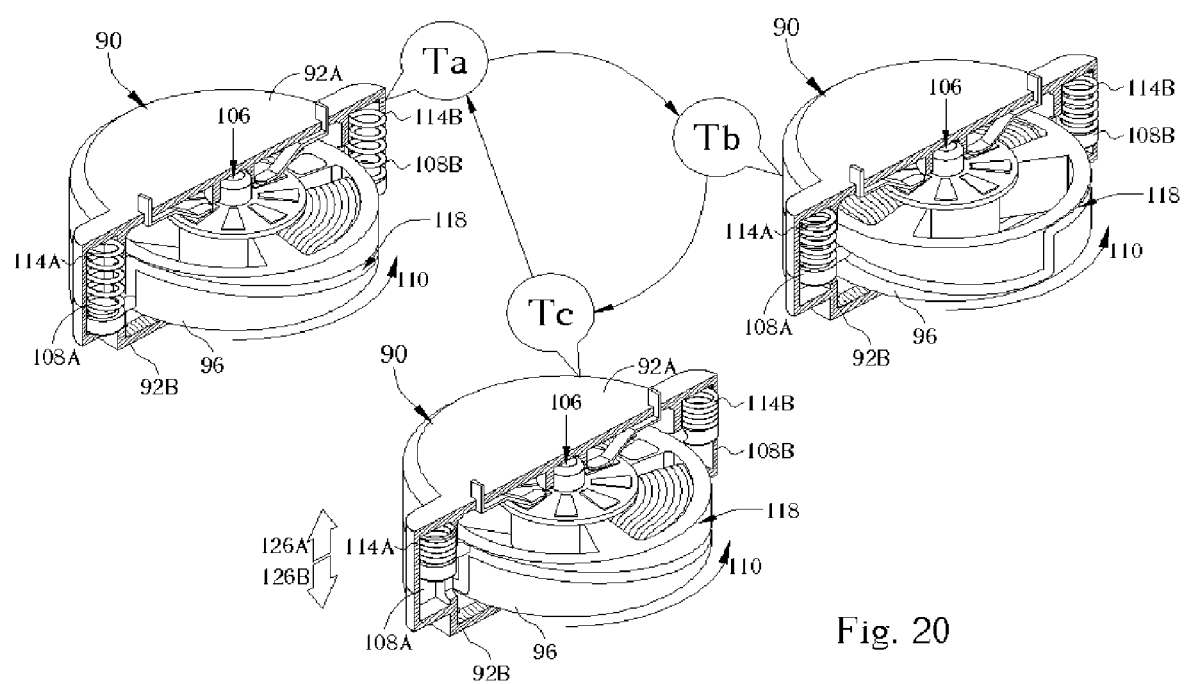
FIG. 20 is a schematic diagram of an engaging structure of FIG. 15 at different vertical positions.
Figure 21:
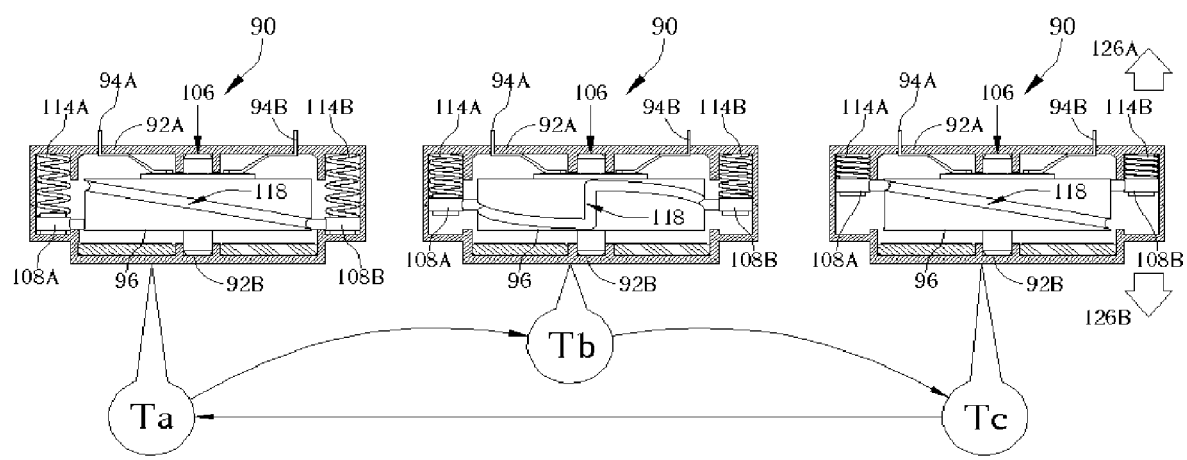
FIG. 21 is a cross-sectional view of an engaging structure of FIG. 15.

Please refer to FIG. 19 to FIG. 21. FIG. 19 is a schematic diagram of the engaging track 118 of the cam 96, FIG. 20 is a schematic diagram of the sliding members 108A, 108B at different vertical positions, and FIG. 21 is a cross-sectional view of the vibrator 90 along line 17—17 in FIG. 16. As FIG. 19 shows, the sliding members 108A, 108B have the prominences 120A, 120B engaging with the engaging track 118 (portions of the cam 96 are omitted for detailed explanation). In the embodiment of FIG. 19, the engaging track 118 has two segments that spiral up and suddenly down, and these two segments link together to form the whole engaging track 118.

As shown in FIG. 20, 21, the sliding members 108A, 108B engage the engaging track 118 at the lowest position, and the cam 96 starts to rotate along direction 110. After rotating 90 degrees around the axle 106, the sliding members 108A, 108B slide up with the engaging track 118 in state Tb. After rotating 180 degrees from the state Ta, the sliding members 108A, 108B slide up to the highest position with the engaging track 118 in state Tc. After state Tc, the engaging track 118 suddenly stops, and the sliding members 108A, 108B suddenly fall to the lowest position from Tc to Ta (the springs 114A, 114B can insure that the sliding members 108A, 108B are back to the lowest position). The vertical vibration can be provided by the repeated movement of the sliding members 108A, 108B. Combining the horizontal and vertical vibrations, the vibrator 90 can provide vibration in multiple directions.

When designing the vibrator 90, quantity of the sliding member and the engaging track can be changed according to requirements. For example, the vibrator can be designed with one sliding member (and one corresponding fillister), and the engaging track can be designed with one or multiple segments. The number of segments can decide the frequency of moving the sliding member up and down. In the preferred embodiment, two (or more than two) sliding members are designed symmetrically to the axle, which provides symmetric biasing with respect to the axle. In addition, the engaging track can be designed protrudent and the sliding member can be designed hollow to achieve the engaging relation. The sliding member can be a high density and heavy material (such as metal) to enhance the vertical vibration of the vibrator 90.

Figure 22:
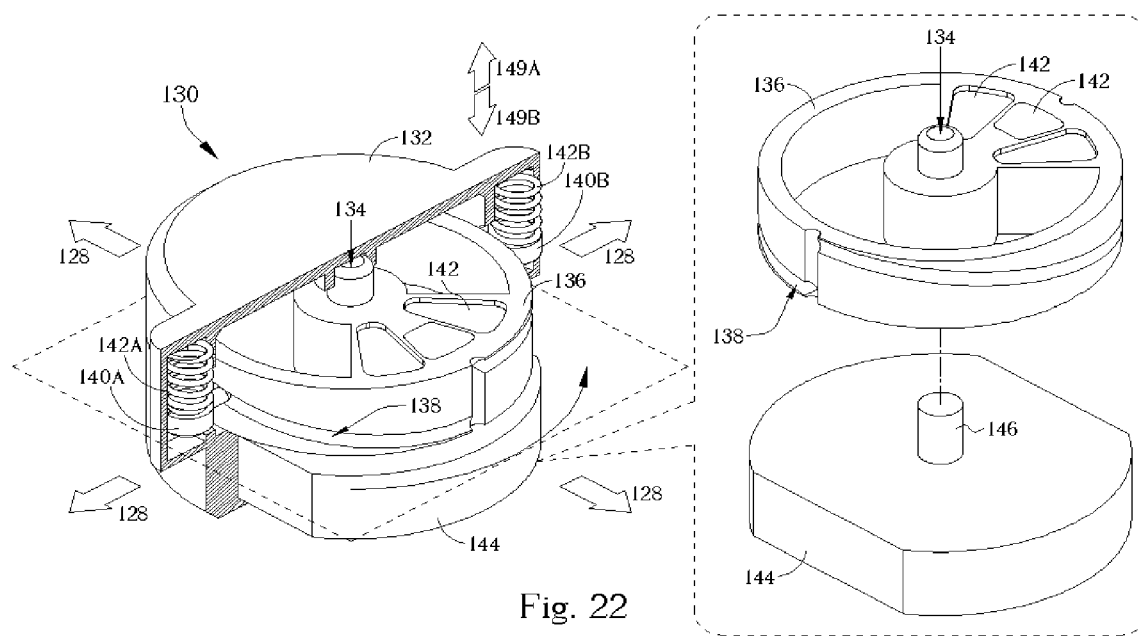
FIG. 22 is a schematic diagram of another vibrator according to the present invention.
Figure 23:
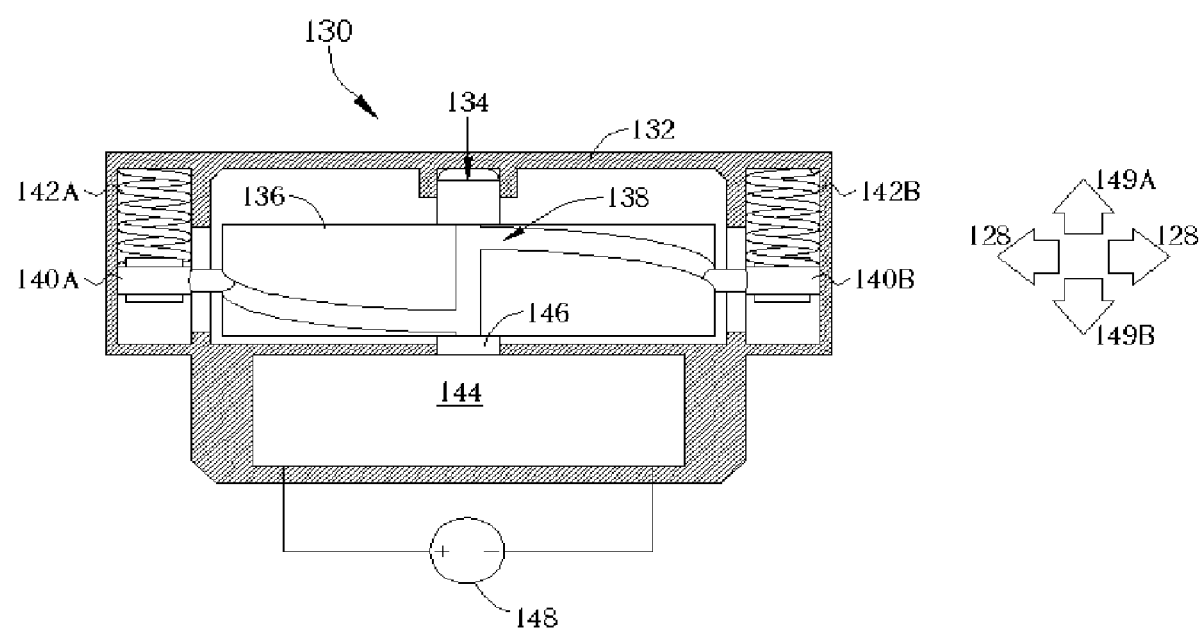
FIG. 23 is a cross-sectional view of a vibrator of FIG. 22.

In the above-mentioned vibrators 50, 90, there are conductive sheets, coils, brushes and magnets in the cam and the housing to work as a motor, but an external motor can also drive the cam in the present invention. Please refer to FIGS. 22, 23. FIG. 22 is a schematic diagram of a vibrator 130 in another embodiment according to the present invention, and FIG. 23 is a cross-sectional view of the vibrator 130. Similar to the vibrator 90, the vibrator 130 also has an eccentric cam 136 in the housing 132 rotating around the axle 134. A weight adjustor 142 makes the center of mass of the cam 136 differ from the axle 134 with an eccentric center, and a spiral engaging track 138 is designed on the periphery of the cam 136. In the housing 132, two sliding members 140A, 140B and the corresponding springs 142A, 142B are designed to achieve the engaging relation.

What is different from the vibrator 90 is that a motor 144 is located in the housing 132 to drive the cam 136 through an axle 146. The motor 144 receives a driving power from a driving circuit 148 and rotates the axle 146 to drive the cam 136. The coils, conductive sheets, brushes and magnets are not needed in the cam 136 and the housing 132. When the motor 144 drives the cam 136 through the axle 146, the eccentric cam 136 can produce a horizontal vibration along direction 128, and the engaging track 138 can drive the sliding members 140A, 140B to produce a vertical vibration along direction 149A, 149B. Thus, the vibrator 130 can provide vibration in multiple directions. The vibrator 50 can be also achieved with a motor similar to that of the vibrator 130.

Figure 24:
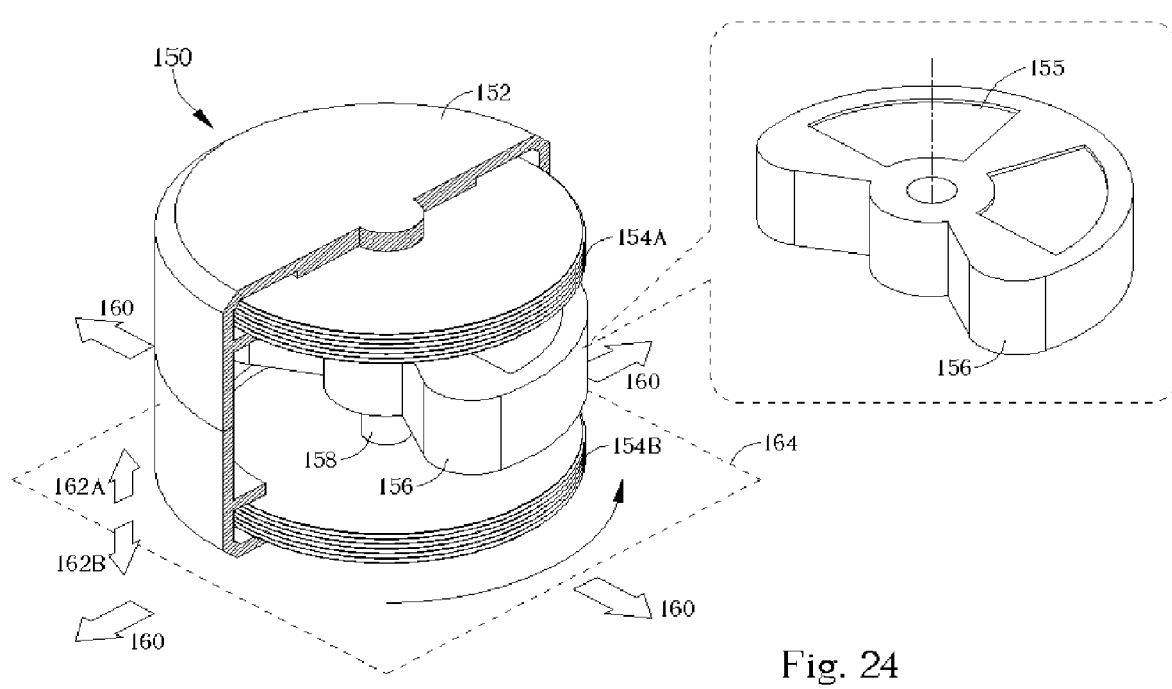
FIG. 24 is a schematic diagram of another vibrator according to the present invention.
Figure 25:
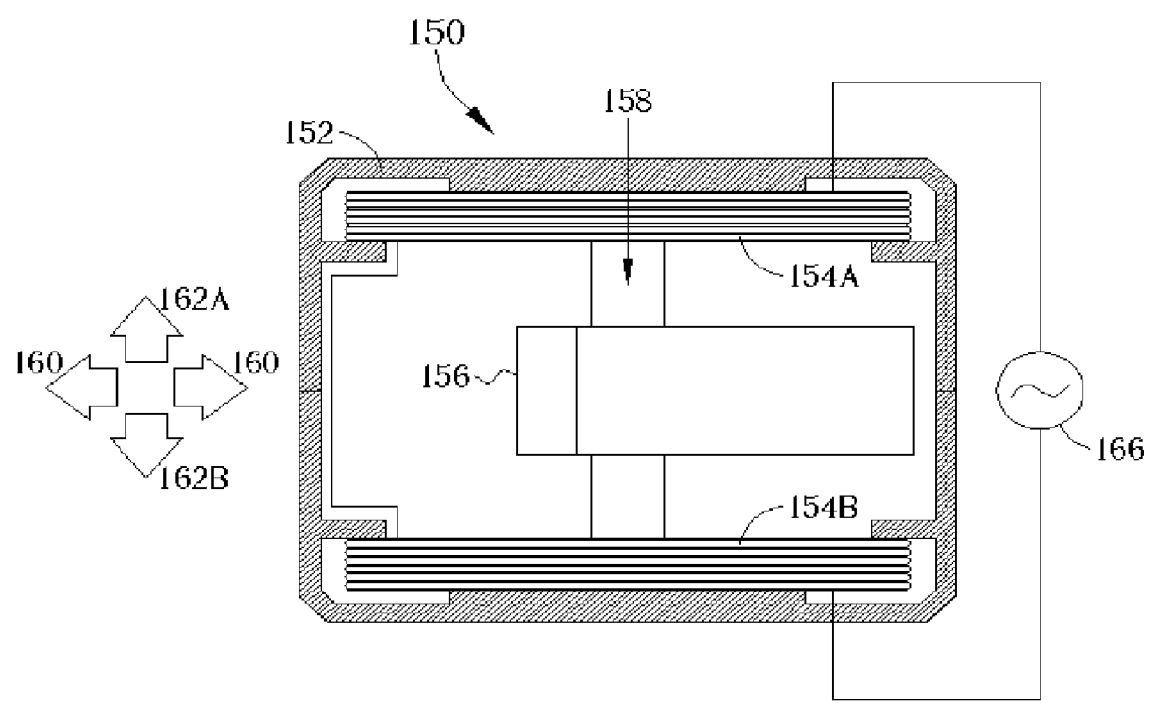
FIG. 25 is a cross-sectional view of a vibrator of FIG. 24.

Please refer to FIGS. 24, 25. FIG. 24 is a schematic diagram of another vibrator 150, and FIG. 25 is a cross-sectional view of the vibrator 150. An eccentric cam 156 is located in the housing 152 of the vibrator 150, and the cam 156 can produce a horizontal vibration along direction 160 when rotating around the axle 158. The cam 158 in the housing 152 can be driven by a motor similar to that of the vibrator 130. These related structures are disclosed in the above-mentioned embodiments, and are not described again.

Besides the horizontal vibration, for producing the vertical vibration, the coils 154A, 154B are equipped on the top and bottom of the housing 152. The cam 156 is a magnet and can slide up and down along the axle 158. When the coils 154A, 1154B receive the AC driving power from the driving circuit 166, it can work as an electromagnet to attract and repel the cam 156. The cam 156 will slide up and down along direction 162A, 162B and produce a vertical vibration. When designing the vibrator 150, if the cam 156 is driven by a motor, the cam 156 or the weight adjustor 155 can be made by a magnet material for sliding up and down with the magnet field of the coils 154A, 154B.

Figure 26:
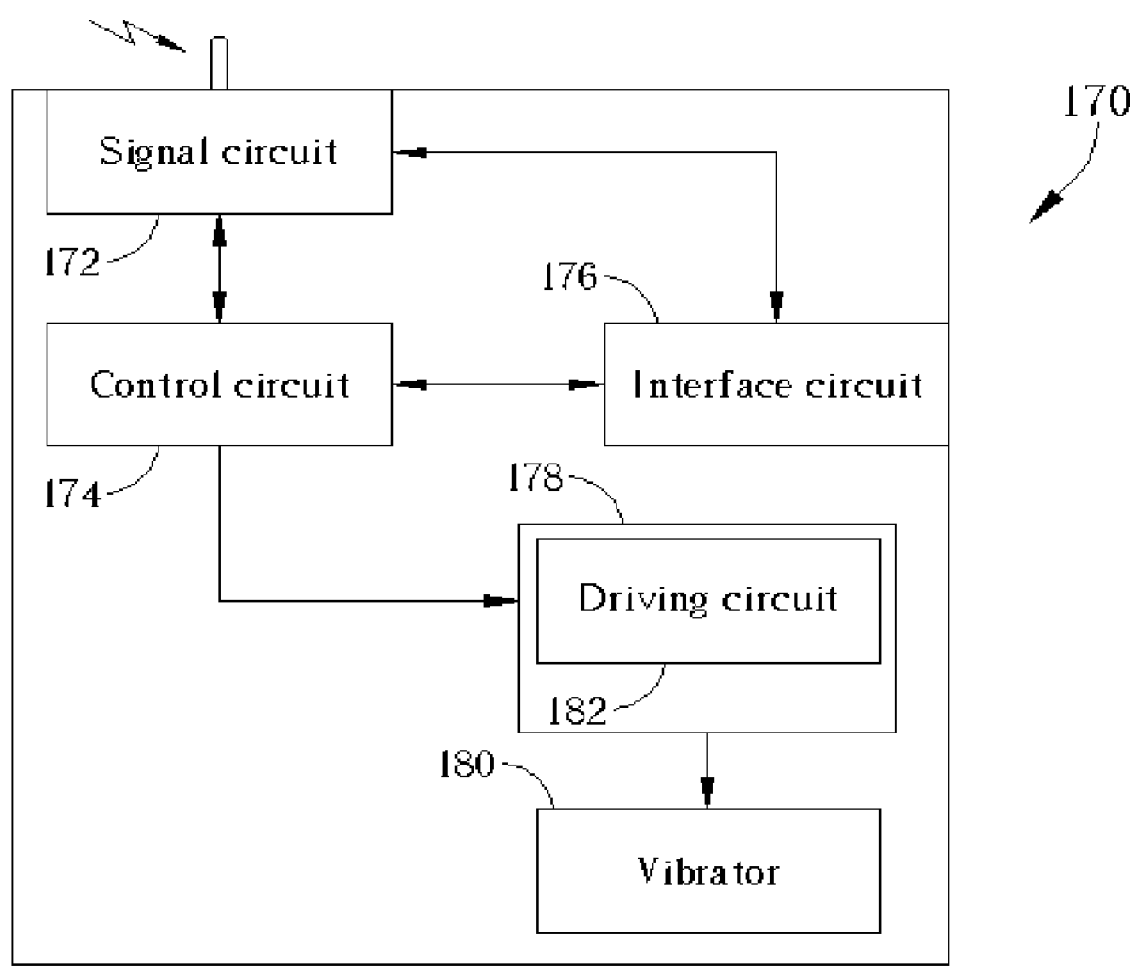
FIG. 26 is a functional diagram of a vibrator applied to an electric apparatus.

The vibration in multiple directions of the claimed invention is suitable for use in mobile phones, pagers, watches, or alarm clocks for reminding users. Please refer to FIG. 26, which is a functional diagram of a vibrator 180 applied to an electric apparatus 170. The electric apparatus 170 can be a mobile phone or a pager, which is equipped with a signal circuit 172, a control circuit 174, an interface circuit 176, a driving module 178 and a vibrator 180. The control circuit 174 controls operation of the electric apparatus 170, and the signal circuit 172 receives the wireless signal and decodes it. The interface circuit 176 is a human-machine interface including a speaker, a display and/or buttons. The driving module 178 includes a driving circuit 182 for providing a driving power to the vibrator 180. The vibrator 180 is similar to the above-mentioned vibrators 50, 90, 130, 150 or other vibrators achieved according to the present invention. If the vibrator 180 is achieved by the vibrator 150, the driving module 182 will have two driving circuits, with one driving circuit driving the electromagnets 154A, 154B to produce a periodic magnet field and the other driving the cam 156 to rotate.

While operating the electric apparatus 170, the user can input a control instruction through the button or touch panel of the interface circuit 176, and the control circuit 174 receives this instruction from the interface circuit 176 and controls the operation of the electric apparatus 170. After the signal circuit 172 receives a wireless signal from the wireless communication network, the control circuit 174 can control the driving module 178 to provide a driving power to the vibrator 180. Then, the vibrator 180 sends a vibrational reminding signal to remind the user. The user can receive the message through the interface circuit 176 to control the electric apparatus 170. The control circuit 174 can show the decoded message through the interface circuit 176 with images on a display or voice in a speaker. In addition, if the electric apparatus 170 is a mobile phone, the sound waves of the user can be transferred to an electrical signal through a microphone of the interface circuit, and the electrical signal can be transmitted to the wireless communication network to achieve a wireless sound communication.

In contrast to the prior art, the vibrator according to the present invention can provide a vibration in different directions so that can effectively remind the user even though the electric apparatus may be compressed or counteracted in some direction. In addition, in the embodiments of the claimed invention, the vibrator almost does not need to increase its capacity to achieve the function, and is suitable for portable electric apparatuses.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A vibrator, comprising:
    a housing;
    a cam rotatably located in the housing, the cam rotating on a plane around an axle that is perpendicular to the plane, a center of mass of the cam projected on the plane substantially differing from a center position of the axle to provide a horizontal vibration parallel to the plane;
    a sliding member; and
    an engaging structure located in the housing, the engaging structure making the cam and the sliding member move relative to the axle along an axial direction while the cam rotates to provide a vertical vibration perpendicular to the plane.

2. The vibrator of claim 1 wherein the sliding member is slidably located in the housing for sliding along the axial direction.

3. The vibrator of claim 1 comprising a plurality of sliding members.

4. The vibrator of claim 1 wherein the engaging structure comprises:
    an engaging track fixed in the housing and contacting a surface of the cam, the engaging track equipped around the axle being uneven for making the cam move up and down while rotating.

5. The vibrator of claim 4 further comprising:
    an elastomer having a first end fixed on the housing and a second end contacting the surface of the cam, the elastomer providing a thrust to the cam to keep the cam in contact with the engaging track.

6. The vibrator of claim 5 further comprising:
    at least one sliding track equipped in the housing along the axial direction, each sliding track corresponding to one sliding member for making the sliding member slide up and down in the housing.

7. The vibrator of claim 5 wherein the elastomer is equipped correspondingly to the sliding member, the first end of the elastomer being connected to the housing and the second end of the elastomer end being connected to the corresponding sliding member, wherein when the cam rotates, the elastomer is capable of providing a thrust to the corresponding sliding member to keep the sliding member in contact with the engaging track.

8. The vibrator of claim 1 wherein the sliding member is equipped in the housing and the cam is magnetic, and the engaging structure further comprises:
    at least one electromagnet fixed in the housing, the electromagnet producing a magnetic field varied with time according to electric power for making the cam move up and down along the axial direction in the housing.

9. The vibrator of claim 1 further comprising:
    at least one conductive brush fixed on the housing for receiving electric power;
    an electromagnet fixed on the cam, the electromagnet receiving electric power from the brush for producing a magnetic field; and
    at least one magnet fixed on the housing for producing interaction with the electromagnet on the cam for making the cam rotate in the housing.

10. The vibrator of claim 1 further comprising:
    a motor fixed on the housing for driving the cam.

11. An electric apparatus, comprising:
    a driving circuit providing a driving power; and
    a vibrator producing vibration after receiving the driving power; the vibrator comprising:
        a housing;
        a cam rotatably located in the housing, the cam rotating on a plane around an axle that is perpendicular to the plane after receiving the driving power, a center of mass of the cam projected on the plane substantially differing from a center position of the axle to provide a horizontal vibration parallel to the plane;
        a sliding member; and
        an engaging structure located in the housing, the engaging structure making the cam and the sliding member move relative to the axle along an axial direction while the cam rotates to provide a vertical vibration perpendicular to the plane.

12. The electric apparatus of claim 11 wherein the sliding member is slidably located in the housing for sliding along the axial direction.

13. The electric apparatus of claim 11 comprising a plurality of sliding members.

14. The electric apparatus of claim 11 wherein the engaging structure comprises:
    an engaging track fixed in the housing and contacting a surface of the cam, the engaging track equipped around the axle being uneven for making the cam move up and down while rotating.

15. The electric apparatus of claim 14 wherein the vibrator further comprises:
- an elastomer having a first end fixed on the housing and a second end contacting the surface of the cam, the elastomer providing a thrust to the cam to keep the cam in contact with the engaging track.

16. The electric apparatus of claim 12 wherein the vibrator further comprising:
- at least one sliding track equipped on the housing along the axial direction, each sliding track corresponding to one sliding member for making the sliding member slide up and down in the housing.

17. The electric apparatus of claim 12 wherein the vibrator further comprises:
- at least one elastomer, each elastomer corresponding to one sliding member, the elastomer having a first end connected to the housing and a second end connected to the corresponding sliding member, wherein when the cam rotates, the elastomer is capable of providing a thrust to the corresponding sliding member to keep the sliding member contacting the engaging track.

18. The electric apparatus of claim 11 wherein the sliding member is equipped in the housing and the cam is magnetic, and the engaging structure further comprises:
- at least one electromagnet fixed in the housing, the electromagnet producing a magnetic field varied with time after receiving the driving power for making the cam move up and down along the axial direction in the housing.

19. The electric apparatus of claim 11 wherein the vibrator further comprises:
- at least one conductive brush fixed on the housing for receiving the driving power;
- an electromagnet fixed on the cam, the electromagnet receiving the driving power from the brush to produce a magnetic field; and
- at least one magnet fixed on the housing for producing interaction with the electromagnet on the cam for making the cam rotate in the housing.

20. The electric apparatus of claim 11 wherein the vibrator further comprises:
- a motor fixed on the housing for driving the cam after receiving the driving power.

21. The electric apparatus of claim 11 further comprising:
- a signal circuit for receiving a wireless signal; and
- a control circuit for controlling the driving circuit to provide the driving power to the vibrator after the signal circuit receives the wireless signal.

* * * * *